Nov. 20, 1962 R. H. HUDDLESTON, JR., ETAL 3,065,407

WELL LOGGING SYSTEM

Filed Sept. 8, 1958

INVENTORS.
RICHARD H. HUDDLESTON JR.
FRANK R BRAVENEC,
EMIL ESZLINGER,

BY *Lyon and Lyon*
ATTORNEYS.

United States Patent Office 3,065,407
Patented Nov. 20, 1962

3,065,407

WELL LOGGING SYSTEM

Richard H. Huddleston, Jr., Frank R. Bravenec, and Emil Eszlinger, Houston, Tex., assignors to Halliburton Company, a corporation of Delaware Filed Sept. 8, 1958, Ser. No. 759,607
5 Claims. (Cl. 324—6)

This invention generally relates to systems for logging the electrical conductivity of earth formations traversed by a well bore and more particularly relates to an improved system for detecting and transmitting indications of such conductivity.

This application is copending with the application to Richard H. Huddleston, Jr., entitled "Constant Electromagnetic Field Well Logging System," Serial No. 614,196, filed October 5, 1956, now No. 2,928,039, patented March 8, 1960.

If two coils, designated as a generator coil and a receiver coil, are supported in selectively spaced and axial relation and the generator coil is excited by an alternating current, a voltage will be directly induced in the receiver coil by the electromagnetic flux field induced by the generator coil. This directly induced voltage will be in quadrature phase relation with respect to the generator coil current. If the generator and receiver coil are immersed in a conductive medium, the generated flux field will produce eddy currents in the medium having paths concentric with the generator coil. These eddy currents will produce a secondary flux field which induces a voltage (herein termed in-phase) in the receiver coil which will be at 180° with respect to the generator coil current. The composite voltage thus induced in the receiver coil, being a vector summation, will have phase characteristics determined by the relative magnitudes of such directly induced and secondarily induced component voltages.

In theory the directly induced quadrature voltage may be reduced to zero by provision of another auxiliary coil or coils connected in series opposition with either the transmitter or receiver coil and provided of proper turns and proper spacing relation to the other coils. Early application of this theory is disclosed in Patent No. 2,220,070 to Aiken.

When so connected the auxiliary generator coil produces a magnetic field in opposition to the main generator coil, effectively nulling the quadrature voltage induced in the receiver coil. By reciprocity the quadrature voltage induced in a main receiver coil will be nulled by that of an auxiliary series opposing receiver coil.

If a receiver coil and an auxiliary receiver coil are properly spaced in relation to the generator coil, the induced quadrature voltage is nulled. More important, by virtue of the diverse positions of the receiver coils, the eddy currents induced in some zones of a surrounding conductive medium are more influential on one of the coils than the other. Since the coils are connected in series opposing, any signal from a zone having common influence on both coils will be nulled and this zone will have little net effect on the resulting signal. If the conductive medium is a well bore filled with conductive drilling mud, the effects of the drilling mud may thus be minimized and the in-phase voltage component induced in the receiver coil will be more nearly responsive to a particular or prescribed zone within the surrounding formation.

While in theory the turns and spacings of these coils can be arranged to create no directly induced quadrature voltage in the receiver coil or coils, it has been found in practice, due to physical manufacturing tolerances and various electrical effects, that a residual spurious signal will remain which cannot be nulled out solely by the foregoing method. Because of these effects encountered in actual manufacture of the coil arrays, the residual signal is actually a complex quantity, having a quadrature component and an in-phase component.

Also, due to resistive and capacitive cable effects the coil array will not function properly when lowered into a well bore if the voltage induced in the receiver coil or coils is directly measured at the earth's surface over multiconductor logging cables. The level of the signal voltage from the receiver coil or coils is of such low magnitude in relation to noise that accurate surface measurement is considered impractical.

It is accordingly the general objects of this invention to provide an induction logging system which may be lowered great distances into well bores and continue to provide transmitted signals accurately representative of the conductivity of a zone of surrounding earth formation.

It is also an object of this invention to provide an induction logging system which may be selectively balanced to a nulled condition when the coil array is disposed in a medium of selected conductivity.

Briefly described the invention provides induction conductivity well logging apparatus having at least one generator coil for producing a first electromagnetic flux field in the earth's formations in the vicinity of the apparatus, and at least one receiver coil for producing a composite signal voltage having a primary component directly induced by said flux field and a secondary component induced by other flux fields produced by said first flux field induced formation eddy currents. A source of constant alternating current is connected with the generator coil. A signal adjustment means is connected with the current source and generator coil for producing voltages of proper amplitude and phase to null unwanted portions of the induced primary and secondary components. The signal adjustment means includes a first voltage source connected with the current source, a means connected between the first voltage source and the receiver coil for producing a first nulling voltage of selected amplitude and phase relation to the primary component, a second voltage source connected with the current source, and means connected between the second voltage source and the receiver coil for producing a second nulling voltage of selected amplitude and phase relation to the secondary component. A linear converter means is connected to the receiver coil to convert a resultant alternating current signal voltage induced in the receiver coil into a corresponding direct current signal. A frequency modulation transmission means including a frequency modulated oscillator and a sub-carrier modulator is connected with the converter for placing a frequency modulator signal corresponding to the direct current voltage on a well logging cable.

Other objects and advantages of the present invention will become apparent from reference to the following description taken in conjunction with the accompanying drawing in which.

Figure 1:
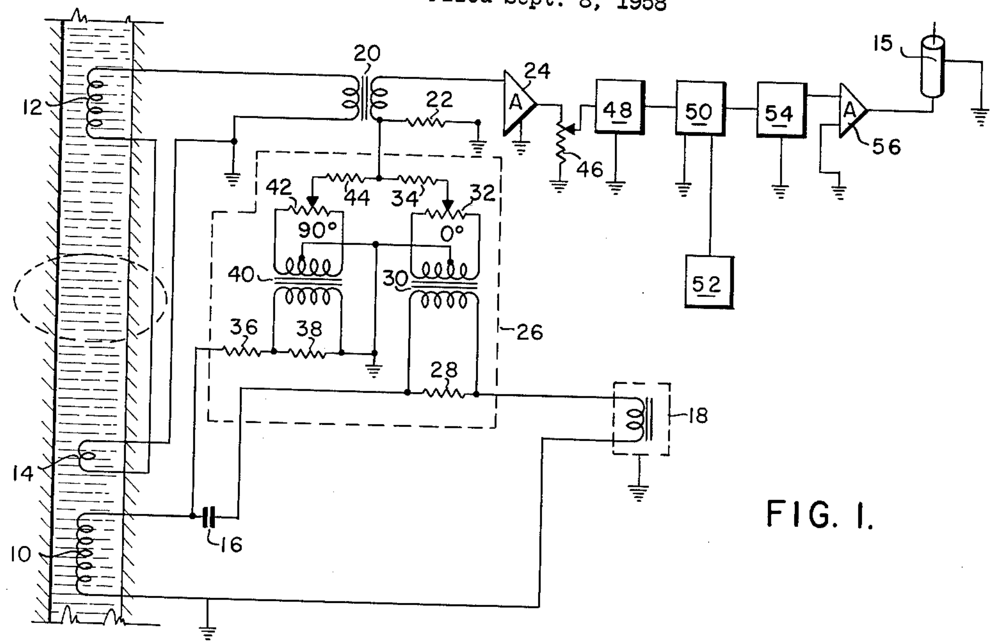
FIGURE 1 is a schematic view of one embodiment of the present invention.

Now referring to FIGURE 1 of the drawing, there is illustrated an induction logging system having an electromagnetic field generator coil 10 provided in spaced apart relation to a receiver coil 12. Disposed in spaced apart relation from coil 10 is an auxiliary receiver coil 14, connected in series opposition to receiver coil 12. As previously mentioned, the system may be provided with one or more generator coils and one or more receiver coils as desired to minimize the conductivity of the bore hole fluids and/or to emphasize the conductivity of well formations in selected zones about the bore hole. A single transmitter coil and two receiver coils are herein illustrated by example only and for simplicity in describing the invention.

The generator coil or coils and the receiver coil or coils are fabricated into an elongated cylindrical assembly which is constructed of insulating and nonmagnetic material, such as glass cloth, epoxy resins, neoprene, rubber, etc. Also, the instrumentation is contained within a fluid tight housing (not shown) normally supported above the coil assembly and connected to the logging cable 15. Cable 15 is connected at the earth's surface to suitable hoisting apparatus and into suitable signal receiving and indicating means (not shown).

Generator coil 10 is connected in series with a capacitor 16. The combination of coil 10 and capacitor 16 provides a series resonant circuit of desired operating frequency, 20 kc. for example, and also serves as the load impedance in connection with a constant alternating current generator 18. Coil 10 has one of its terminals grounded, i.e. is at a reference potential. Generator 18 functions to provide a constant current through coil 10, producing a constant alternating electromagnetic flux field in the surrounding formation. As shown in dashed lines, the field produced by generator coil 10 induces eddy currents in the surrounding formation which are concentric about the axis of the coil. For further description of generator 18, reference may be had to the above referenced Patent No. 2,928,039.

The series opposing receiver coils 12 and 14 are connected in series with the primary of a receiver input transformer 20, one terminal of which is connected to ground. The secondary of transformer 20 is connected through a summing resistor 22 to ground and into a linear A.C. amplifier 24.

Connected between ~~the~~ generator circuit and receiver circuit is a null adjustment circuit 26, which purpose is to null the undesirable induced voltages previously described. The nulling circuit 26 provides both in-phase and quadrature voltage nulling adjustment. A resistor 28 is connected in series between capacitor 16 and generator 18, creating a voltage drop which is in phase with the generator coil current. The primary coil of a transformer 30 is connected across resistor 28. The secondary of transformer 30 is connected across a potentiometer 32. The secondary of transformer 30 also has a center tapped connection to ground, i.e. is at the reference potential. The voltage at the tap of potentiometer 32 may thus be reversed in phase and adjusted in magnitude from zero to a selected maximum constant voltage. The tap of potentiometer 32 is connected through a resistor 34 into connection between the transformer 20 secondary and summing resistor 22. The value of resistor 34 is very high relative to that of resistor 22. The voltage produced through transformer 30 may be varied both in phase and in magnitude to null out unwanted in-phase voltages induced in receiver coils 12 and 14.

To provide a nulling voltage for the quadrature voltage induced in receiver coils 12 and 14, a somewhat similar circuit is provided. The voltage developed across generator coil 10 leads the generator coil current by 90°. To utilize this source of voltage, a voltage divider containing resistors 36 and 38 in series is connected from between coil 10 and capacitor 16 to ground. The primary of a transformer 40 is connected across resistor 38. The secondary of transformer 40 is center tapped to ground and connected across a potentiometer 42. The tap of potentiometer 42 is connected through a resistor 44 to the junction of summing resistor 22 and the secondary of transformer 20 as is the resistor 34. As with potentiometer 32, potentiometer 42 provides phase reversal and voltage adjustment from zero to a selected maximum constant voltage. A quadrature voltage may thus be provided across summing resistance 22 to null the result of the quadrature voltage induced in receiver coils 12 and 14. As with resistor 34, resistor 44 is of large value in relation to resistor 22, causing resistor 22 to function as a current summing device.

When the coil array is surrounded by a medium having infinite resistivity (or zero conductivity) such as air, the only signal induced in receiver coils 12 and 14 will be that due to the previously mentioned coupling, manufacturing tolerances, or physical distortion. As previously described, this resultant voltage will contain both in-phase and quadrature components. Such components are individually nulled by respective addition of equal and opposite voltages from potentiometers 32 and 42.

As the system is lowered into a well bore having a surrounding conductive formation, the desired resultant voltage induced in coils 12 and 14 will be that secondarily induced in response to the formation eddy currents. The magnitude of this voltage is substantially proportional to the conductivity of the formation. Thus, when properly balanced, the magnitude of the resultant voltage found at the output of transformer 20 will be a direct indication of the conductivity of the surrounding formation. This output voltage is connected into amplifier 24.

Amplifier 24 is connected through an attenuating potentiometer 46 into a linear converter amplifier 48. The output of converter 48 is a D.C. voltage. The primary function of potentiometer 46 is to provide sensitivity adjustment. The D.C. output of amplifier 48 is connected into an A.C. modulator 50, driven by a 200 cycle multivibrator 52. Modulator 50 converts the D.C. voltage into a 200 cycle sub-carrier modulating voltage. The output of modulator 50 is connected into a frequency modulated carrier oscillator 54, providing a modulating signal for the oscillator. Oscillator 54, usually termed a transmitter, may be of selected center frequency, for example 10.5 kc. The frequency modulated signal is then applied to the conductor of cable 15 through a line coupling amplifier 56 for transmisison to the earth's surface. Power, at 400 cycles for example, is supplied to the system through cable 15 and appropriate matching and rectifying circuits to provide necessary D.C. operating voltages for the system (not shown).

The modulated signal impressed on the conductor of cable 15 is received at the surface through filtering, limiting, and demodulating circuits, and recorded on a conventional well logging recorder. For further description of such demodulation and recording systems reference may be had to Patent No. 2,573,133 to Greer. The demodulated signal, representative of the formation conductivity, may be fed into a voltage reciprocating circuit which output is concurrently recorded as an indication of the formation resistivity.

Figure 2:
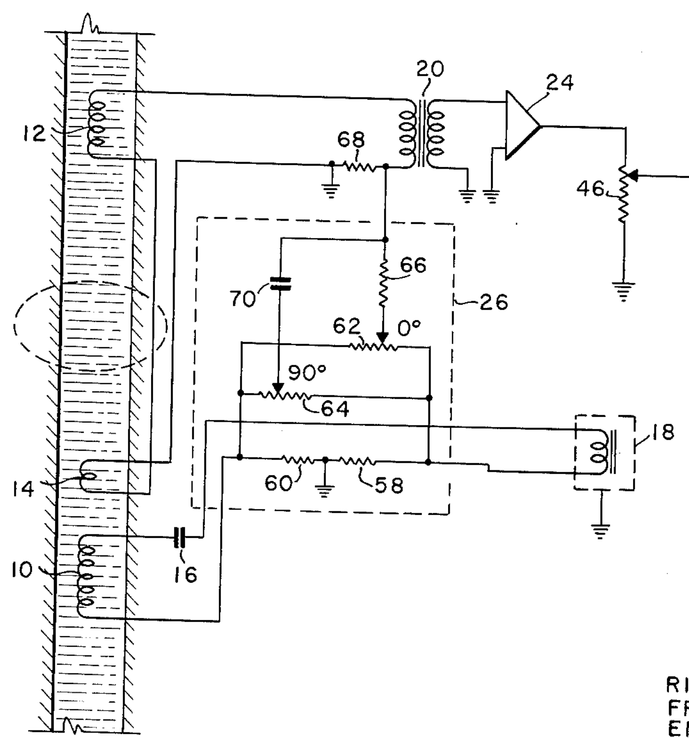
FIGURE 2 is an alternate embodiment of a null adjustment circuit provided in the present invention.

An alternate portion of the system is illustrated in FIGURE 2. The corresponding circuit elements bear corresponding numbers. As shown, the voltage sources from the generator circuit are obtained by connection of resistors 58 and 60 in series with generator coil 10 and generator 18. The junction of resistors 58 and 60 is connected to ground, i.e. is at a reference potential. Connected in parallel across resistors 58 and 60 are adjustment potentiometers 62 and 64. The tap of potentiometer 62 is connected through a resistor 66 to the junction of resistor 68 and the primary of transformer 20. The tap of potentiometer 64 is connected through a capacitor 70 to the junction of resistor 68 and the primary of transformer 20. Resistor 68 is connected at its other end to ground and also connected in series with the receiver coils 12 and 14, and with the transformer primary.

Voltages are developed across resistors 58 and 60 which are in phase with the transformer coil current. With the junction of resistors 58 and 60 in connection to ground and a terminal of resistor 68 connected to ground, the taps of potentiometer 62 may be adjusted for phase reversals and from zero to a maximum selected voltage.

The relative value of resistor 66 to resistor 68 is high, permitting the voltage derived from potentiometer 62 to be summed to a null across resistor 68 with the corresponding in-phase voltage component induced in receiver coils 12 and 14.

The voltage from the tap of potentiometer 64 passes from capacitor 70 and resistor 68 to ground. The combination of capacitor 70 and resistor 68 serves the function of a quadrature phase shifter when the impedance of capacitor 70 is very large compared with the resistance of resistor 68. Example values to attain this purpose are about .008 microfarad for capacitor 70 and one ohm for resistor 68. Thus, with proper adjustment of the potentiometer 64, a quadrature nulling signal reversible in phase will appear across resistor 68 for a null summation with the corresponding quadrature voltage component from the receiver coil array.

It is pointed out that reciprocity will apply with the nulling circuits herein disclosed if multiple generator coils are utilized in lieu of or in addition to the multiple receiver coils as shown.

In operation the well logging tool containing the illustrated system is usually suspended in air and the potentiometers 32 and 42 (or 62 and 64) are individually adjusted to produce a zero vectoral summation of voltage into amplifier 24. The tool is then lowered into the well bore, the log usually being taken upon the return upward trip. Though not illustrated it is pointed out that the potentiometers 32 and 42 (or 62 and 64) may be provided for remote actuation from the surface while the tool is in the well bore to calibrate the input voltage into amplifier 24 under particular conductivity conditions encountered in the well bore.

Other modifications in detail of the system will become apparent to those skilled in this art. The system herein described is intended to serve as an illustration of example embodiments of the invention. Various changes may therefore be made without departing from the spirit of the invention or the scope of the annexed claims.

That being claimed is:

1. A well logging tool connectable to the well logging cable for suspension into a well bore, including in combination, at least three axially spaced apart coils comprising one flux generator coil group and one receiver coil group, an alternating current generator, a generator circuit comprising said generator connected with said generator coil group for producing an electromagnetic flux field in the vicinity of said tool, said receiver coil group producing a composite voltage having a first component and a second component, a first null adjustment circuit connected into said generator circuit for producing a first constant nulling voltage of selected amplitude and relation to said first component and connected with said receiver coil for group to null any unwanted portion of said first component, a second null adjustment circuit connected to said generator circuit for producing a second constant nulling voltage of selected amplitude and relation to said second component and connected to said receiver coil group to null any unwanted portion of said second component, said composite voltage being altered by said null adjustment circuits to be a net signal voltage representing the conductivity of a particular surrounding zone, converter means connected to said receiver coil group for converting said net signal voltage into a corresponding carrier signal, and means to transmit said carrier signal over said well logging cable to the earth's surface, said first null adjustment circuit comprising, a first and a second resistor having a series connection with said generator circuit and a common connection to a voltage return, a first potentiometer connected across said series connection, a third resistor, a summing resistor, the tap of said first potentiometer being series connected through said third resistor and then said summing resistor to said voltage return, and said second null adjustment circuit comprising, said series connection, a second potentiometer connected across said series connection, a capacitor, said summing resistor, the tap of said second potentiometer being series connected through said capacitor then through said summing resistor to said voltage return, said summing resistor being in series connection with said receiver coil group.

2. A well logging tool for suspension into a well bore by means of a wireline comprising, at least three axially spaced-apart coils comprising a flux generator coil group and a receiver coil group; a detection circuit electrically interconnected with said receiver coil group; a summing resistor in said detection circuit; an alternating current generator; a generator circuit comprising said generator connected with said generator coil group for producing an electromagnetic flux field in the vicinity of said tool; said receiver coil group producing a composite voltage having first and second voltage components within said detection circuit; a first null adjustment circuit including a first potentiometer having fixed terminals interconnected with said generator circuit and a movable tap connected to one terminal of said summing resistor; a second null adjustment circuit including a second potentiometer having fixed terminals interconnected with said generator circuit and a movable tap connected to said summing resistor terminal; one of said nulling circuits including a phase shift means whereby the phase of the output thereof is out of phase with respect to the other of said nulling circuits; said first and second adjustment circuits respectively producing at their respective movable taps first and second nulling voltages of selected amplitude and relation to said first and second voltage components; said nulling circuits in their interconnection with said summing resistor being effective to inject a selectable nulling voltage into the detection circuit for nulling out any unwanted portion of either said first or second component whereby said composite voltage may be altered to provide a net signal voltage representing the conductivity of a particular surrounding zone; and means to transmit said net signal voltage over said wireline to the earth's surface.

3. In an induction logging system, a transmitter coil, a receiver coil in inductive relationship to said transmitter coil and also in inductive relationship to magnetic flux produced by eddy currents that result from the magnetic field produced by said transmitter coil, said eddy currents producing an in-phase component in said receiver coil and current in said transmitter coil producing a quadrature component in said receiver coil, a source of alternating current, circuit means connecting said source to said transmitter coil to produce an alternating current flow in said transmitter coil, a signal transmission system coupled to said receiver coil to which said in-phase and quadrature components are applied, said circuit means having a point of reference potential, first potential means coupled to said circuit means with an intermediate point on said potentiometer means corresponding in potential to said reference potential, second potentiometer means coupled to said circuit means with an intermediate point on said second potentiometer means corresponding to said reference potential, means coupling the tap on said first potentiometer means between said circuit means and said transmission system to introduced a first voltage from said source to said transmission system, means coupling the tap on said second potentiometer means between said circuit means and said transmission system to introduce a second voltage from said source to said transmission system, one of said coupling means incorporating phase shift means to shift the phase of one of said voltages in quadrature relationship to the other of said voltages.

4. An induction logging system as set forth in claim 3 wherein each of said potentiometer means has its outside terminals connected to corresponding outside terminals of a resistance which is connected in series with said transmitter coil, said resistance having an intermediate point at said reference potential, the tap on one of said potentiometer means being coupled to said transmission system through a reactance network to produce said shift in phase of one of said voltages, and the tap on the other one of said potentiometer means being coupled to said transmission means through a resistance network.

5. An induction logging system as set forth in claim 3 wherein two transformers are incorporated each having a secondary winding with an intermediate point thereof at said reference potential, the primary winding of one of said transformers having its terminals coupled to corresponding outside terminals of a resistance connected in series with said transmitter coil, the primary winding of the other one of said transformers being coupled to corresponding outside terminals of a reactance element connected in series with said transmitter coil to produce said shift in phase of one of said voltages.

References Cited in the file of this patent

UNITED STATES PATENTS

| | | |
|---|---|---|
| 2,220,070 | Aiken | Nov. 5, 1940 |
| 2,573,133 | Greer | Oct. 30, 1951 |
| 2,615,956 | Broding | Oct. 28, 1952 |
| 2,722,657 | Janssen | Nov. 1, 1955 |
| 2,723,375 | Schuster | Nov. 8, 1955 |
| 2,788,483 | Doll | Apr. 9, 1957 |
| 2,790,138 | Poupon | Apr. 23, 1957 |
| 2,848,710 | Owen | Aug. 19, 1958 |